United States Patent Office 3,514,403
Patented May 26, 1970

3,514,403
INSULATING COMPOSITIONS OF FIBROUS ALKALI METAL TITANATES AND CARBOXYMETHYL CELLULOSE
Carl Heinrich Muendel, Wilmington, Del., assignor to E. I. du Pont de Nemours and Company, Wilmington, Del., a corporation of Delaware
No Drawing. Continuation-in-part of application Ser. No. 562,461, July 5, 1966. This application Apr. 29, 1968, Ser. No. 725,170
Int. Cl. C04b 43/02; E04b 1/76
U.S. Cl. 252—62
7 Claims

ABSTRACT OF THE DISCLOSURE

An insulation composition comprising fibrous alkali metal titanates and, as a binder, an alkali metal derivative of carboxymethyl cellulose.

CROSS-REFERENCE

This application is a continuation-in-part of United States application S.N. 562,461, filed July 5, 1966, and now abandoned.

BACKGROUND OF THE INVENTION

U.S. Pats. 2,833,620 and 2,841,470 disclose the synthesis of a class of water-insoluble inorganic alkali metal titanates corresponding to the formula $M_2O \cdot (TiO_2)n$ in which $n$ has a value of 4 to 9 and M is an alkali metal, i.e., sodium, potassium, rubidium or cesium. These fibrous titanates are micro fibers and asbestos-like in character. In loose or bulk form they provide unique insulating materials with an exceptional ability to diffuse and reflect infrared radiation, especially when their diameters range from 0.25 to 1 micron and their lengths range from approximately 100 microns up to 1 millimeter. They can be prepared (U.S. 2,833,620) by reacting a water-soluble basic oxygen-containing alkali metal compound, such as a hydroxide, with an oxygen-containing compound, such as $TiO_2$, at a temperature of at least 400° C. and an elevated pressure. Alternatively, their preparation can be effected (U.S. 2,841,470) by dissolving a nonfibrous alkali metal titanate in a fused, salt melt of an alkali metal chloride or fluoride, maintaining a portion of the molten halide saturated with the dissolved compound as the fibrous alkali metal titanate is formed, and separating the crystallized titanate fibers from the salt by water extraction.

According to U.S. 3,129,105, fibrous water insoluble alkali metal titanates are formed which have the formula $M_xH_y(O(TiO_2)_n)_z$ wherein $x$ equals 1 to 2; $y$ equals 1 to 15; $z$ equals $\frac{1}{2}(x+y)$; $n$ is 6–7; and M is an alkali metal of atomic number at least 11.

Among other titanate fibers useful in the present invention are those obtained in accordance with the disclosures of U.S. 3,328,117. These are fibrous water-insoluble titanates obtained by calcining at temperatures ranging from 200–1150° C. and at preferably 600–1100° C., a dry, nonfluid reaction mixture comprising a basic oxygen-containing compound, such as $TiO_2$, in the molar proportions ranging from 1:3 to 1:9, and preferably from 1:3 to 1:7 to obtain a fibrous colloidal, pigmentary or insulation grade size of product, depending on the conditions of calcination. Fibers prepared according to the disclosures of this patent having diameters ranging from 0.1 to 3.0 microns and lengths 10 to 1000 times said diameters have been found particularly useful. The inherent strength from mechanical interlocking of the fibers will be enhanced as the fiber length increases to the insulating grade size, or to a size which ranges between 100 microns and 1 millimeter in length.

Fibrous alkali metal titanates having the formula $M_2O \cdot H_2O \cdot TiO_2$ wherein M is an alkali metal and the molar ratio of $TiO_2/M_2O+H_2O$ is between 2.0 and 6.0, and the molar ratio of $TiO_2/M_2O$ is between 10 and 98 are the subject of United States application S.N. 705,291, filed Feb. 14, 1968 and are useful as the alkali metal titanate component of the structure of the present invention.

For many purposes the unfired strength of unbonded fiber aggregates is insufficient for handling and fabrication into molded shapes. Addition of large amounts of combustible binders to obtain the necessary green strength is undesirable because of smoke released upon initial heat-up. While some inorganic binders such as clay give sufficient green strength they have been found to have adverse effects on such high temperature properties as shrinkage.

SUMMARY OF THE INVENTION

It has now been found that if, in the manufacture of a fibrous metal titanate insulating compact or formed object, such as a sheet, block, board, or irregular shape of prescribed configuration there is empolyed as a binder from about 0.01 to 3% by weight, based on said titanate, of an alkali metal (sodium, potassium, rubidium and cesium) derivative of carboxymethyl cellulose, very strong bonding takes place between the cellulose compound and the titanate and production is assured of an improved, strong insulation board or compact possessing desired unusually high green strength. Combinations of sodium derivatives and potassium derivatives of carboxymethyl cellulose with alkali metal titanates are most effectively useful for this purpose. These combinations provide unusually strong compacts at markedly lower adhesive concentrations than with other types of binders. Further advantages can be obtained by mixing with the fibrous titanates as much as 20% by weight based on weight of titanate, other inorganic materials having at least one minor dimension such as fibers of mineral wool or platy materials such as mica. These other inorganic materials may be added to achieve lower density in the green pads or cast pieces, to improve high temperature properties such as shrinkage, or to reduce cost without serious detrimental effect on the green strength of the object. Also, other binders, such as polyvinyl alcohol, themselves less efficient than the alkali metal derivatives of carboxymethyl cellulose in providing green strength, may be used with the alkali metal derivaties of carboxymethyl cellulose to give improved wet tackiness as might be required to fabricate a composite board of alkali metal titanate and a sheet material. In addition, altered titanate fibers, containing such components as baria, alumina, titania, zirconia, or other materials operate satisfactorily and are strengthened suitably by the use of alkali metal derivatives of carboxymethyl cellulose.

In forming the structures of the present invention, a liquid suspension mixture of the fibrous alkali metal titanate in an alkali metal derivative of carboxymethyl cellulose and water is formed, with the amount of water used being dependent on the dimensions of the fibrous titanate and controlled so that the suspension has the proper consistency for extruding, trowelling, brushing, or spraying as desired. Preferably, in the mixing operation, the solution of the alkali metal derivative of carboxymethyl cellulose is formed by slowly adding the alkali metal derivative of carboxymethyl cellulose to highly agitated water. The operable weight ratio of the total alkali metal derivative of carboxymethyl cellulose-titanate mixture to water can range from 1:2 to 1:200, and the useful concentration range for the alkali metal derivative of carboxymethyl cellulose can extend from 0.01% to 3% by weight of the titanate fibrous material present. An amount of from 0.3 to 1% is preferred for the preparation of molded blocks and an amount from 0.1 to 0.5% is preferred for preparing felted boards. Following extrusion, trowelling, brushing or spraying of the mixture thus obtained water is removed through drying in the atmosphere or at temperatures up to 100° C. and the desired shape or board is recovered.

The following examples are cited to illustrate the invention. They are not intended to limit it in any manner.

Example 1

Fibrous potassium titanate, having a diameter averaging 0.75 micron and length ranging between 75 to 300 microns, is added to distilled water in the ratio of 1 part fiber to 3½ parts water and is blended with ½ part of a solution of 1.0 gram in 100 cc. of water, of a commercial grade sodium carboxymethyl cellulose (Brookefield viscosity, of 1300–2200 centipoises at 25° C. in 1% aqueous solution, and a degree of substitution of 0.65 to 0.85). The resulting thick paste is then mixed by kneading and is molded into a 6-inch diameter by ¾" thick disc and dried at 90° C. Strength measurements, made on ¾" x ¾" x 2¾" bars sawed from the cast block and broken on a flexure-test machine over a 2" span, show a tensile strength of 66 lbs./sq. in. measured in flexure compared to a 1.9 lb./sq. inch value where no binder is employed. Similarly, in comparable operations but in which other binders, including urea formaldehyde resins, casein, clays, cornstarch, alkyd resins, shellac and acrylic emulsions are used under equivalent conditions of board preparation, green strength values of 2–10 lbs./sq. in. result.

Employing the same technique except that potassium carboxymethyl cellulose is employed instead of the sodium derivative, the block obtained is found to have a strength of 50 lbs. per sq. inch.

When the procedure first recited above is repeated except that 0.01 part by weight of Madagascar amber phlogopite mica ground in a high speed blender with water as an approximately 2% slurry, then filtered and dried at 130° C. is incorporated in the blend, the cast block has a strength of 64 lbs./sq. inch.

When the procedure first recited above is repeated except that 1.0 gram of polyvinyl alcohol (0.5% by weight based on the weight of the fibrous potassium titanate) is used along with the sodium carboxymethyl cellulose as a binder (primarily for the purpose of giving a "tackier" character to the binder) the cast block has a strength of 78.5 p.s.i. versus a value of 2.6 p.s.i. when a block is made with the same amounts of potassium titanate and polyvinyl alcohol, but without the sodium carboxymethyl cellulose.

When the procedure first recited above is repeated, except that sodium titanate fibers having an average diameter of 1 micron and lengths ranging up to 400 microns are used instead of potassium titanate, a 1 in. sq. x 6 in. cast strip shows a strength of 70 lbs. per sq. inch compared to 3 lbs. per sq. inch of a similar product but containing no sodium carboxymethyl cellulose as a binder.

Example 2

100 grams of potassium titanate with average diameters of 0.9 micron and having lengths varying from 50 to 350 microns are dispersed in an aqueous solution containing 1.78 grams of a commercial grade sodium carboxymethyl cellulose (having a Brookfield viscosity of less than 18 centipoises in 2% aqueous slurry at 25° C.). The resulting slurry mixture contains 2850 grams of distilled water. The slurry is then filtered on a Buchner funnel over a filter paper and the resulting block is thereafter dried at 90° C. The block obtained shows a strength of 25 lbs./sq. inch compared to 16 lbs./sq. inch exhibited by a similar composition but in which no binder is used in its preparation.

Example 3

Example 2 is repeated except using the high viscosity sodium carboxymethyl cellulose of Example 1 incorporated in the mixture to the extent of 0.6 gram per 100 grams of potassium titanate fiber. The block obtained has a strength of 102 lbs. per sq. inch. A strong block is also obtained when this procedure is repeated except that 10 grams of the potassium titanate is replaced with an equal weight of "Fiberfrax" mineral wool, an alumino-silicate amorphous staple fiber.

The alkali metal derivatives of carboxymethyl cellulose useful in preparing structures of the present invention, can be prepared, as is well known, by treating an alkali cellulose compound with a chloroacetate such as sodium chloroacetate, the degree of substitution of the carboxymethyl groups in the cellulose material being dependent upon the reaction conditions and can range from about 0.5 to about 1.5. A preferred chain length for binding purposes comprises the maximum commercially available, that is, one which gives a Brookfield viscosity of 1300–2200 centipoises at 25° C. in a 1% aqueous solution, although products at the low viscosity extreme of less than 18 centipoises at 25° C. in a 2% aqueous solution also can be used. Hence, the entire chain length range is applicable for use in the invention, depending upon the degree or extent of binding necessary or desired in a particular instance and the degree of dilution used for preparing the slurry containing the binder and fibrous ingredients. The most useful shaped structures formed from the compositions of the present invention are boards, ranging in thickness from ½ inch to 3 inches or more, sawed, shaped, and fitted for various insulating applications. Fibrous potassium titanate or sodium titanate having diameters ranging from 0.25 to 1 micron and lengths ranging from approximately 100 microns up to 1 millimeter are especially useful in such shapes. Molded shapes also can be made from these titanates, particularly those having configurations adapted to encase pipes, valves, and furnaces and for specialty uses such as for fireproofing aviation instrument recorders etc.

Insulating boards can be prepared in accordance with either of two known methods, e.g. felting or molding. In the felting or pad pulling method a dilute slurry of fibrous material and organic reinforcing agent is formed and the slurry is then subjected to filtration under controlled conditions on a conventional wire screen such as in a Fourdrinier machine or filter box.

In molding procedures, a wet paste composed of the fibrous material, water and the binder is extruded and molded to the desired shape. Shrinkage upon heating will be found to be relatively equal in all directions in this type of block formation. In the molding operation a solids concentration of from 10 to 30% in the suspension is usually satisfactory for use, whereas in felting operations a concentration of less than 5% solids can be used.

The inherent strength from mechanical interlocking of the fibers will be enhanced as the fiber length increases. The strength of boards or fabricated objects containing a fibrous alkali metal titanate and the alkali metal derivative of carboxymethyl cellulose as a binder generally depends on, among other factors, (1) the length of the fiber, (2) the degree of felting and interlocking which takes place in the formed objects, (3) the binder concentration, and (4) the orientation of the fibers in the formed article to the direction of stress. For example, if dilute solutions of the fiber and binder are filtered, the degree of interlocking and felting will be much higher than occurs with, for example, a molded block which is formerd by extruding a paste of fibers into the desired shape. It is also contemplated that very dilute solutions can be sprayed to lay up many thin layers of a fibrous slurry on an object to coat it with any desired thickness. In spraying, one obtains a lower degree of interlocking than obtained upon filtration or felting.

I claim:
1. An improved insulation composition consisting essentially of a fibrous alkali titanate having particle diameters of from about 0.1 to about 3 microns with ratios of length-to-diameter of from about 5 to about 4000, and, as a binder for said composition, from 0.01 to 3% by weight, based on the titanate, of an alkali metal derivative of carboxymethyl cellulose with a degree of substitution of about 0.5 to about 1.5 and with a Brookfield viscosity at 25° C. of 1300–2200 centipoises in a 1% aqueous solution and less than 18 centipoises in a 2% aqueous solution.

2. The product of claim 1 in which the binder is sodium carboxymethyl cellulose.

3. The product of claim 1 in which the binder is potassium carboxymethyl cellulose.

4. The product of claim 1 in which the fibrous titanate is sodium titanate having diameters ranging from 0.25 to 1 micron and lengths ranging from 100 microns up to 1000 microns.

5. The product of claim 1 in which the fibrous titanate is potassium titanate having diameters ranging from 0.25 to 1 micron and lengths ranging from 100 microns up to 1000 microns.

6. The product of claim 1 wherein up to about 20% by weight of said fibrous alkali metal titanate is replaced by an inorganic material selected from the group consisting of clay, mineral wool, asbestos and mica.

7. The product of claim 6 wherein the said different inorganic structure is mineral wool.

References Cited

UNITED STATES PATENTS

| | | | |
|---|---|---|---|
| 3,249,568 | 5/1966 | Reis | 252—62 X |
| 3,331,658 | 7/1967 | Lewis et al. | 106—299 X |

OTHER REFERENCES

Hercules Cellulose Gum (CMC), Hercules Powder Co., 1951, p. 15.

LEON D. ROSDOL, Primary Examiner

I. GLUCK, Assistant Examiner

U.S. Cl. X.R.

23—51, 202; 106—299; 260—751

PO-1050
(5/69)

UNITED STATES PATENT OFFICE
CERTIFICATE OF CORRECTION

Patent No. 3,514,403      Dated May 26, 1970

Inventor(s) Carl Heinrich Muendel

It is certified that error appears in the above-identified patent and that said Letters Patent are hereby corrected as shown below:

Column 4, line 73 (claim 1) "alkali titanate" should read -- alkali metal titanate --.

SIGNED AND SEALED
NOV 17 1970

(SEAL)
Attest:

Edward M. Fletcher, Jr.
Attesting Officer

WILLIAM E. SCHUYLER, JR.
Commissioner of Patents